US009356807B2

(12) United States Patent
Hart et al.

(10) Patent No.: US 9,356,807 B2
(45) Date of Patent: May 31, 2016

(54) COMMUNICATION SYSTEMS

(75) Inventors: Michael John Beems Hart, London (GB); Yuefeng Zhou, Haywards Heath (GB)

(73) Assignee: Fujitsu Limited, Kawasaki-shi (JP)

( * ) Notice: Subject to any disclaimer, the term of this patent is extended or adjusted under 35 U.S.C. 154(b) by 915 days.

(21) Appl. No.: 11/840,570

(22) Filed: Aug. 17, 2007

(65) Prior Publication Data
US 2008/0043816 A1 Feb. 21, 2008

(30) Foreign Application Priority Data

Aug. 18, 2006 (GB) .................................. 0616477.6

(51) Int. Cl.
*H04B 7/26* (2006.01)
*H04L 5/00* (2006.01)
(Continued)

(52) U.S. Cl.
CPC .............. *H04L 12/66* (2013.01); *H04B 7/2606* (2013.01); *H04W 84/047* (2013.01);
(Continued)

(58) Field of Classification Search
CPC ............. H04B 7/2606; H04B 7/15592; H04L 5/0007; H04L 5/0023; H04L 5/0037; H04L 12/66; H04W 84/047; Y02B 60/50
USPC ................. 455/414.4, 7, 13.7, 450, 464, 509; 370/315, 492, 509, 280, 294, 314, 321, 370/330, 347
See application file for complete search history.

(56) References Cited

U.S. PATENT DOCUMENTS 5,719,868 A 2/1998 Young
6,370,384 B1 4/2002 Komara
(Continued)

FOREIGN PATENT DOCUMENTS

CN 1237841 1/2006 ............... H04Q 7/38
EP 0 151 280 12/1984
(Continued)

OTHER PUBLICATIONS

CRAWMC On the Capacity of Relay Assisted Wireless MIMO Channels 2004 IEEE 5th WOrkshop on Signal Processing Advances in Wireless Communications Boris Rankov and Armin Wlttneben Swiss Federal Institue of Technology.*
(Continued)

*Primary Examiner* — Michael Mapa
(74) *Attorney, Agent, or Firm* — Baker Botts L.L.P.

(57) ABSTRACT

A transmission method for use in a two-hop wireless communication system is provided. The system includes a source apparatus, a destination apparatus and an intermediate apparatus. The source apparatus is operable to transmit information along two links forming a communication path extending from the source apparatus to the destination apparatus via the intermediate apparatus. The intermediate apparatus is operable to receive information from the source apparatus and to transmit the received information to the destination apparatus. The system has access to a time-frequency format for use in assigning available transmission frequency bandwidth during a discrete transmission interval, said format defining a plurality of transmission windows within such an interval. Each window occupies a different part of that interval and has a frequency bandwidth profile within said available transmission frequency bandwidth over its part of that interval. Furthermore, each said window is assignable for such a transmission interval to said source or intermediate apparatus for use in transmission. The transmission method for use in this system includes employing said format to transmit information along the path as two successive transmission signals, link by link, said signals being transmitted using different transmission windows of a particular such transmission interval.

23 Claims, 7 Drawing Sheets

Frame Structure

(51) Int. Cl.
*H04B 7/155* (2006.01)
*H04L 12/66* (2006.01)
*H04W 84/04* (2009.01)

(52) U.S. Cl.
CPC .......... *H04B 7/15592* (2013.01); *H04L 5/0007* (2013.01); *H04L 5/0023* (2013.01); *H04L 5/0037* (2013.01); *Y02B 60/50* (2013.01)

(56) References Cited

U.S. PATENT DOCUMENTS

| | | | |
|---|---|---|---|
| 6,421,330 | B1 | 7/2002 | Chung et al. |
| 6,590,878 | B1* | 7/2003 | Uchida et al. ................. 370/330 |
| 6,701,129 | B1 | 3/2004 | Hashem et al. |
| 7,096,274 | B1 | 8/2006 | Ci et al. |
| 2002/0080816 | A1 | 6/2002 | Spinar et al. |
| 2002/0101907 | A1 | 8/2002 | Dent et al. |
| 2002/0177447 | A1* | 11/2002 | Walton et al. ................. 455/452 |
| 2002/0181444 | A1 | 12/2002 | Acampora |
| 2003/0054771 | A1 | 3/2003 | Chappaz |
| 2003/0125067 | A1 | 7/2003 | Takeda et al. |
| 2003/0129982 | A1* | 7/2003 | Perini ........................... 455/442 |
| 2003/0157894 | A1 | 8/2003 | Han et al. |
| 2004/0005861 | A1 | 1/2004 | Tauchi |
| 2004/0038682 | A1* | 2/2004 | Persson et al. ................. 455/436 |
| 2004/0100929 | A1 | 5/2004 | Garcia-Luna-Aceves |
| 2004/0109428 | A1 | 6/2004 | Krishnamurthy |
| 2004/0192204 | A1* | 9/2004 | Periyalwar et al. ............. 455/25 |
| 2005/0030887 | A1 | 2/2005 | Jacobsen et al. |
| 2005/0037789 | A1* | 2/2005 | Rhee et al. ..................... 455/507 |
| 2005/0048914 | A1 | 3/2005 | Sartori et al. |
| 2005/0157681 | A1* | 7/2005 | Tajima .......................... 370/332 |
| 2006/0023745 | A1 | 2/2006 | Koo et al. |
| 2006/0029017 | A1 | 2/2006 | Mudulodu et al. |
| 2006/0046643 | A1 | 3/2006 | Izumikawa et al. ............... 455/7 |
| 2006/0153145 | A1* | 7/2006 | Voyer et al. ................... 370/335 |
| 2006/0256741 | A1 | 11/2006 | Nozaki |
| 2006/0264172 | A1 | 11/2006 | Izumikawa et al. |
| 2007/0086418 | A1* | 4/2007 | Jang et al. ..................... 370/347 |
| 2007/0104223 | A1 | 5/2007 | Lee et al. ...................... 370/470 |
| 2007/0217353 | A1* | 9/2007 | Asa et al. ...................... 370/315 |
| 2007/0280172 | A1* | 12/2007 | Tan et al. ...................... 370/335 |
| 2008/0075178 | A1* | 3/2008 | Lappetelainen et al. ...... 375/260 |

FOREIGN PATENT DOCUMENTS

| | | | | |
|---|---|---|---|---|
| EP | 0963086 | | 1/1999 | ............... H04L 27/26 |
| EP | 1 617 693 | | 1/2006 | |
| EP | 1 635 592 | | 3/2006 | |
| EP | 1 677 443 | | 7/2006 | |
| EP | 1677443 | | 7/2006 | ............... H04B 7/26 |
| EP | 1 804 430 | A1 | 7/2007 | |
| JP | 2006 074325 | | 3/2006 | ............... H04B 7/26 |
| JP | 2007 129726 | | 5/2007 | ............... H04B 7/15 |
| WO | WO 99/44341 | | 9/1999 | |
| WO | WO 01/76289 | | 10/2001 | |
| WO | WO 03/058984 | | 7/2003 | |
| WO | WO 2004/056013 | | 7/2004 | |
| WO | WO 2004/107693 | | 12/2004 | |
| WO | WO 2005/067173 | | 7/2005 | |
| WO | WO 2006/000091 | | 1/2006 | ............... H04J 11/00 |
| WO | WO 2006/012554 | | 2/2006 | |
| WO | WO 2006/065069 | | 6/2006 | |
| WO | WO 2006/098608 | | 9/2006 | |
| WO | WO 2006/120161 | | 11/2006 | |

OTHER PUBLICATIONS

Recommendation on PMP Mode Compatible TDD Frame Structure IEEE 802.16 Presentation Submission Template (Rev. 8.3) IEEE C802.16mmr-05/027r1 Date Submitted: Nov. 11, 2005 Fang-Ching Ren, Chang-Lung Hsiao, Chun-Chieh Tseng, and Wern-Ho Sheen.*
Recommendation on PMP Mode Compatible TDD Frame Structure IEEE 802.16 Presentation Submission Template (Rev. 8.3) IEEE C802.16mmr-05/027r1 Date Sumbitted: Nov. 11, 2005 Fang-Ching Ren, Chang-Lung Hsiao, Chun-Chieh Tseng, and Wern-Ho Sheen.*
Communication from the European Patent Office, European Search Report for Application No. EP 07 11 3538, Dec. 27, 2007, 7 pages.
Communication from the European Patent Office, European Search Report for Application No. EP 07113557.8-1525, Dec. 3, 2007, 7 pages.
The Patent Office, Search Report under Section 17, U.K. Application No. GB0616482, date of search Oct. 27, 2006, 1 page.
The Patent Office, Search Report under Section 17, U.K. Application No. GB0616471, date of search Oct. 27, 2006, 1 page.
The Patent Office, Search Report under Section 17, U.K. Application No. GB0616477, date of search Oct. 27, 2006, 1 page.
The Patent Office, Search Report under Section 17, U.K. Application No. GB0616472, date of search Nov. 3, 2006, 1 page.
The Patent Office, Search Report under Section 17, U.K. Application No. 0616479, date of search Oct. 27, 2006, 1 page.
The Patent Office, Search Report under Section 17, U.K. Application No. 0622124, date of search Dec. 7, 2006, 1 page.
The Patent Office, Search Report under Section 17, U.K. Application No. 0622122, date of search Nov. 28, 2006, 1 page.
IEEE Computer Society, "IEEE Standards for Information Technology, 803.11g™," Part 11: Wireless LAN Medium Access Control (MAC) and Physical Layer (PHY) Specifications, Amendment 4: Further Higher Data Rate Extension in the 2.4 GHz Band, Jun. 27, 2003, 78 pages.
Hart et al., "Relay Midamble," IEEE 802.16 Broadband Wireless Access Working Group < http://ieee802.org/16>, pp. 0-3, Nov. 6, 2006.
Hart et al., "Frame Structure for Multihop Relaying Support," IEEE 802.16 Broadband Wireless Access Working Group < http://ieee802.org/16>, IEE C80216j/138, ieee 802.16 meeting #46, pp. 0-9, Nov. 2006.
Hart et al., >, "TDD MR Frame Structure," IEEE 802.16 Broadband Wireless Access Working Group < http://ieee802.org/16>, pp. 1-10, Oct. 20, 2006.
Hart, "Dimensioning and System Level Analysis of an HSDPA Network with Relaying Nodes," 5 pages, 2005.
Chu, "Polyphase Codes with Good Periodic Correlation Properties," IEEE Transactions on Information Theory, Jul. 1972, pp. 531-532.
Frank et al., "Phase Shift Pulse Codes with Good Periodic Correlation Properties," IRE Transactions on Information Theory, pp. 381-382, Oct. 1962.
Milewski, "Periodic Sequences with Optimal Properties for Channel Estimation and Fast Start-Up Equalization," IBM Research and Development Journal, pp. 426-431, Sep. 1983.
Hart, "Optimal Transmit Power Balancing in Multi-Hop Networks," Fujitsu Laboratories of Europe, Ltd., 6 pages, 2005.
Golay, "Multi-Slit Spectrometry," Journal of the Optical Society of America, vol. 39, No. 6, pp. 437-444, Jun. 1949.
Golay, "Complementary Series," IRE Transactions on Information Theory, IT 7, pp. 82-87, Apr. 1961.
Zhou et al., "Communication Systems," Pending U.S. Appl. No. 11/840,492, filed Aug. 17, 2007.
Zhou et al., "Communication Systems," Pending U.S. Appl. No. 11/840,518, filed Aug. 17, 2007.
Hart et al., "Communication Systems," Pending U.S. Appl. No. 11/840,546, filed Aug. 17, 2007.
Hart et al., "Communication Systems," Pending U.S. Appl. No. 11/840,570, filed Aug. 17, 2007.
Zhou et al., "Communication Systems," Pending U.S. Appl. No. 11/840,595, filed Aug. 17, 2007.
Hart et al., "Communication Systems," Pending U.S. Appl. No. 11/840,621, filed Aug. 17, 2007.
Hart et al., "Communication Systems," Pending U.S. Appl. No. 11/840,644, filed Aug. 17, 2007.
Hart et al., "Communication Systems," Pending U.S. Appl. No. 11/840,669, filed Aug. 17, 2007.
Hart et al., "Communication Systems," Pending U.S. Appl. No. 11/840,429, filed Sep. 7, 2007.
Hart et al., "Communication Systems," Pending U.S. Appl. No. 11/840,430, filed Sep. 7, 2007.

(56) References Cited

OTHER PUBLICATIONS

Hart et al., "Wireless Communication Systems," Pending U.S. Appl. No. 11/856,139, filed Sep. 17, 2007.
Hart et al., "Wireless Communication Systems," Pending U.S. Appl. No. 11/856,145, filed Sep. 17, 2007.
Hart et al., "Communication Systems," Pending U.S. Appl. No. 11/856,178, filed Sep. 17, 2007.
Communication from the European Patent Office, European Search Report for Application No. EP 08 15 8421, Oct. 21, 2008, 1 pages.
Communication from the European Patent Office, European Search Report for Application No. EP 07 11 3481, Oct. 19, 2007, 1 pages.
Kaneko et al., "Proposed Relay Method with P-MP Structure of IEEE802.16-2004," 2005 IEEE 16th International Symposium on Personal, Indoor and Mobile Radio Communications, pp. 1606-1610, Sep. 11, 2005.
Hoymann et al., "Multihop Communication in Relay Enhanced IEEE 802.16 Networks," The 17th Annual IEEE International Symposium on Personal, Indoor and Mobile Radio Communications, 5 pages, Sep. 1, 2006.
Etri et al, Transmission of IP Packets over Ethernet over IEEE 802.16, draft-riegel-16ng-ip-over-eth-over-80216-01.txt, Oct. 1, 2006, pp. 1-16.
Kim et al., Fair and Efficient Multihop Scheduling Algorithm for IEEE 802.16 BWA Systems, pp. 895-901, Oct. 3-7, 2005.
European Patent Office, European Search Report for Application No. EP 08 15 5435, Aug. 1, 2008, 8 pages.
European Patent Office, European Search Report for Application No. EP 07 11 3483, Sep. 26, 2007, 6 pages.
IEEE Computer Society, IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz, Apr. 1, 2003, p. 1, 19, 68-70, and 80-87.
Hart et al., "Factors That Affect Performance of a Mobile Multihop Relay System," IEEE 802.16 Presentation Submission Template (Rev.8.3), Sep. 13, 2005, 19 pages.
Relay Task Group of IEEE 802.16, "Part 16: Air Interface for Fixed and Mobile Broadband Wireless Access Systems," Multihop Relay Specification, p. 1-12 and 78-104, Jun. 6, 2007.
Chinese Office Action with English translation; Application No. 201010122264.6; pp. 19, May 24, 2012.
Fang-Ching Ren et al.; "Recommendation on PMP Mode Compatible TDD Frame Structure"; IEEE 802.16 Session # 39; pp. 16, Nov. 11, 2005.
Japanese Office Action with English Translation; Application No. 2007-284145; pp. 7, Jan. 17, 2012.
Gang Shen et al., "Recommendations on IEEE 802.16j", IEEE C802.16; pp. 7, May 2006.
Zhang et al.; "Some Considerations on Mobile Multi-hop Relay System"; IEEE 802.16; pp. 11, 2006.
Japanese Office Action with English Translation; Application No. 2007-214172; pp. 6, Jan. 24, 2012.
Japanese Office Action with English Translation; Application No. 2007-214173; pp. 12, Dec. 13, 2011.
Matty Levanda; "Low-cost-relay interaction with BS"; IEEE 802.16 Sessions # 44; pp. 10, Jul. 3, 2006.
Matty Levanda; "Stationary-systems based relaying part: Frame structure"; IEEE 802.16 Sessions # 43; pp. 10, May 5, 2006.
Extended European Search Report; Application No. 09171903.9; pp. 6, Apr. 2, 2012.
Hart et al.; "Relay midamble"; IEEE 802.16 Braodband Wireless Access Working Group; http://ieee802.org/16; pp. 3, Nov. 7, 2006.
Asa et al.; "Relay Strategy of Broadcast Messages in Mobile Multihop Relay"; IEEE 802.16 Presentation Submission Template (Rev. 8.3); Venue: IEEE 802.16 Session #41, New Delhi, India; pp. 14, Jan. 6, 2006.
Taiwanese Office Action with English translation; Application No. 99110353; pp. 11, May 10, 2013.
Chinese Office Action and English translation; Application No. 201110140429.7; pp. 19, May 14, 2013.
Leng et al. ; "A frame structure for mobile multi-hop relay with different carrier frequencies"; IEEE 802.16 Session # 40; pp. 8, Nov. 11, 2005.
Chinese Office Action with English translation; Application No. 200710141986.4; pp. 16, Dec. 5, 2012.
Taiwanese Office Action with English translation; Application No. 100131685; pp. 15, Mar. 12, 2014.

\* cited by examiner

Frame Structure

Node Activity Within Each Zone

Example of Zone Usage Within One Cell

Example TDD frame structure from OFDMA physical layer of the IEEE802.16 standard

COMMUNICATION SYSTEMS

RELATED APPLICATION

This application claims foreign priority benefits under 35 U.S.C. §119 of United Kingdom Application No. GB 0616477.6, filed on Aug. 18, 2006, entitled "Communication Systems".

CROSS-REFERENCE TO RELATED APPLICATIONS

This application relates to the following applications, each of which is incorporated herein by reference:
COMMUNICATION SYSTEMS, application Ser. No. 11/840,492, filed Aug. 17, 2007;
COMMUNICATION SYSTEMS, application Ser. No. 11/840,518, filed Aug. 17, 2007;
COMMUNICATION SYSTEMS, application Ser. No. 11/840,546, filed Aug. 17, 2007;
COMMUNICATION SYSTEMS, application Ser. No. 11/840,595, filed Aug. 17, 2007;
COMMUNICATION SYSTEMS, application Ser. No. 11/840,621, filed Aug. 17, 2007;
COMMUNICATION SYSTEMS, application Ser. No. 11/840,644, filed Aug. 17, 2007;
COMMUNICATION SYSTEMS, United Kingdom Application No. GB 0616478.4, filed on Aug. 18, 2006;
COMMUNICATION SYSTEMS, United Kingdom Application No. GB 0616475.0, filed on Aug. 18, 2006; and
COMMUNICATION SYSTEMS, United Kingdom Application No. GB 0616476.8, filed on Aug. 18, 2006.

TECHNICAL FIELD

This invention relates in general to communication systems, and more particularly to a frame structure for a multihop communication system.

OVERVIEW

Currently there exists interest in the use of multihop techniques in packet based radio and other communication systems, where it is purported that such techniques will enable both extension in coverage range and increase in system capacity (throughput).

In a multi-hop communication system, communication signals are sent in a communication direction along a communication path (C) from a source apparatus to a destination apparatus via one or more intermediate apparatuses. FIG. 4 illustrates a single-cell two-hop wireless communication system comprising a base station BS (known in the context of 3G communication systems as "node-B" NB) a relay node RN (also known as a relay station RS) and a user equipment UE (also known as mobile station MS). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from a user equipment (UE), via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

FIGS. 5a and 5b illustrate a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIG. 5b is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIG. 5a provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modeled by:

$$L = b + 10n \log d \qquad (A)$$

Where d (meters) is the transmitter-receiver separation, b(db) and n are the pathloss parameters and the absolute pathloss is given by $l = 10^{(L/10)}$.

The sum of the absolute path losses experienced over the indirect link SI+ID may be less than the pathloss experienced over the direct link SD. In other words it is possible for:

$$L(SI) + L(ID) < L(SD) \qquad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE 802.11a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both subcarriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, \quad 0 \leq t \leq T_s \quad (1)$$

where $\Delta f$ is the sub-carrier separation in Hz, $T_s = 1/\Delta f$ is symbol time interval in seconds, and $c_n$ are the modulated source signals. The sub-carrier vector in (1) onto which each of the source signals is modulated $c \in C_n$, $c = (c_0, c_1 \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of sub-carriers, to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE 802.16 standard incorporates both an FDD and TDD mode. As an example, FIG. 6 illustrates the single hop TDD frame structure used in the OFDMA physical layer mode of the IEEE 802.16 standard (WiMAX).

Each frame is divided into DL and UL subframes, each being a discrete transmission interval. They are separated by Transmit/Receive and Receive/Transmit Transition Guard interval (TTG and RTG respectively). Each DL subframe starts with a preamble followed by the Frame Control Header (FCH), the DL-MAP, and the UL-MAP.

The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

SUMMARY OF EXAMPLE EMBODIMENTS

In accordance with one embodiment of the present invention, a transmission method for use in a two-hop wireless communication system is provided. The system includes a source apparatus, a destination apparatus and an intermediate apparatus. The source apparatus is operable to transmit information along two links forming a communication path extending from the source apparatus to the destination apparatus via the intermediate apparatus. The intermediate apparatus is operable to receive information from the source apparatus and to transmit the received information to the destination apparatus. The system has access to a time-frequency format for use in assigning available transmission frequency bandwidth during a discrete transmission interval, said format defining a plurality of transmission windows within such an interval. Each window occupies a different part of that interval and has a frequency bandwidth profile within said available transmission frequency bandwidth over its part of that interval. Furthermore, each said window is assignable for such a transmission interval to said source or intermediate apparatus for use in transmission. The transmission method for use in this system includes employing said format to transmit information along the path as two successive transmission signals, link by link, said signals being transmitted using different transmission windows of a particular such transmission interval.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

When a node is required to support two independent links to two different nodes, e.g. a relay station communicating with a base station and a mobile, the existing TDD or FDD frame structures require some modification in order to make realization of the relay practical. Particular embodiments of the invention provide a frame structure (format) for a multi-hop communication system that is an extension of the standard TDD frame structure.

One proposed frame structure is designed for the case that the control information originating from the head node that controls the overall medium access is receivable by all subordinate nodes operating in the network. It is further designed in a manner that enables legacy single hop TDD mobile devices that have no knowledge of a relay station to operate within the new relaying enabled system.

If control information is not receivable from the head node (or source apparatus) then an extra frame period is required for two-hop transmission. This is because control information sent by the source apparatus to the intermediate apparatus cannot then be received by the destination apparatus in the same frame. The destination apparatus (especially a legacy apparatus) will be designed to receive such control information at the beginning of the frame and therefore an extra frame period is required for the intermediate apparatus to transmit the control information on to the source at the beginning of the frame (in the preamble) and then transmit the data. Thus a frame latency of 1 is incurred.

Figure 1:
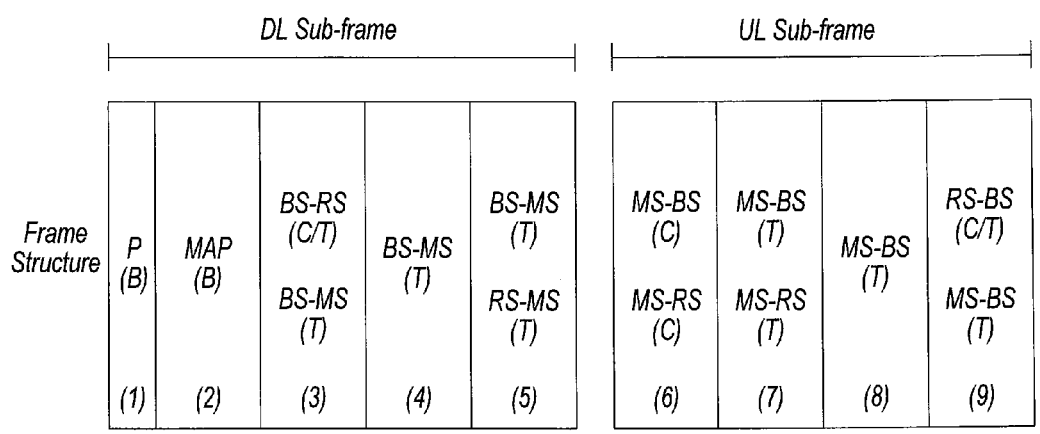
FIG. 1 shows a frame structure.

An example frame structure is shown in FIG. 1. It is composed of a number of transmission and reception zones for both the downlink and uplink sub-frames. The zone types are either:

B Broadcast of control related information such as: synchronization sequences, commands, information and details of the structure or layout of the frame.
C Dedicated control information that is transmitted in a non-broadcast zone (i.e. either to individual or a group of receivers)
T Dedicated user-data (transport) transmission
The 9 different zones identified in FIG. 1 are described in Table 1.

TABLE 1

Description of the zones.

| Zone Number | Label | Description |
|---|---|---|
| 1 | P | Preamble or synchronization sequence transmissions for cell identification |
| 2 | MAP | Frame format description (zone boundaries, allocations within the zones, etc) |
| 3 | BS-RS/BS-MS | BS to RS transmission zone. Can also be used for BS to MS transmission if spatial division multiple access is supported (i.e. the same transmission resource can be used to communicate with more than one entity) |
| 4 | BS-MS | BS to MS transmission zone. RS is not active during this period, it is processing any received information and turning around prior to transmission. |
| 5 | BS-MS/RS-MS | RS to MS transmission zone. Can also be used by the BS to transmitted to MSs that do not experience significant levels of interference from RS transmissions. |
| 6 | MS-BS/MS-RS | MS control information transmission zone. Information can be received by both the RS and the BS. Control information can be information or requests from the MS. |
| 7 | MS-BS/MS-RS | MS to RS transmission zone. Can also be used by MSs who do not cause interference to the RS to transmit to the BS. |
| 8 | MS-BS | MS to BS transmission zone. RS is not actively transmitting or receiving during this period; it is processing any received information prior to turning around. |
| 9 | RS-BS/MS-BS | RS to BS transmission zone. Can also be used for MS to BS transmission if spatial division multiple access is supported (i.e. the same transmission resource can be used to communicate with more than one entity) |

Figure 2:
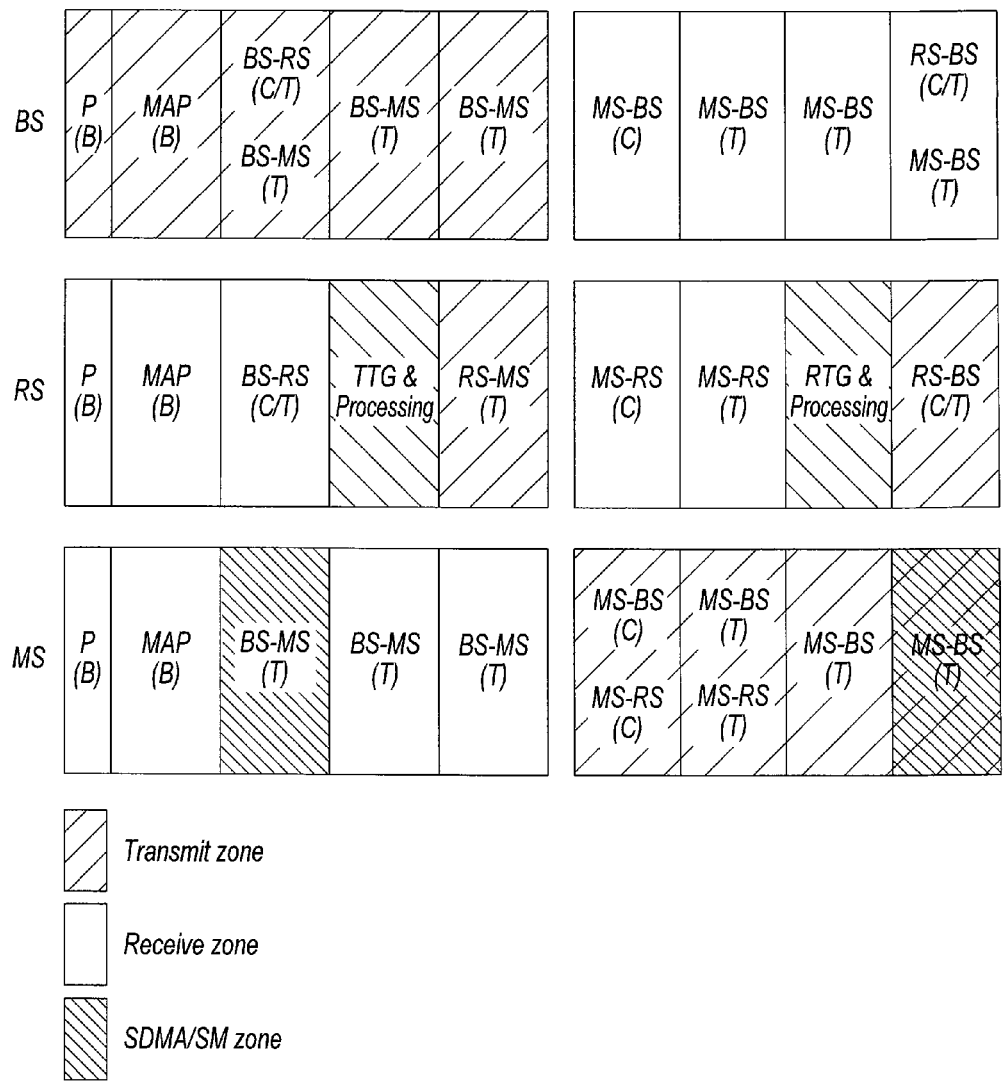
FIG. 2 shows node activity within each zone.

FIG. 2 illustrates a preferred operation of the BS, RS and MS in terms of its activity within each of the zones described in Table 1.

Figure 3:
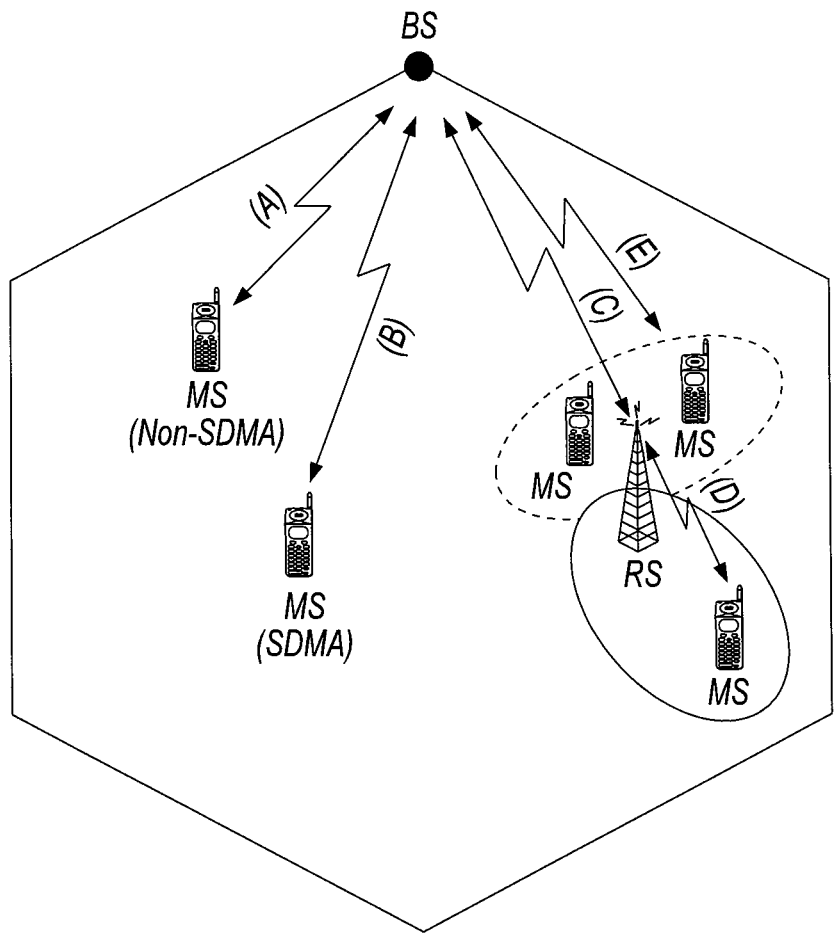
FIG. 3 shows an example of zone usage within one cell.
Figure 4:
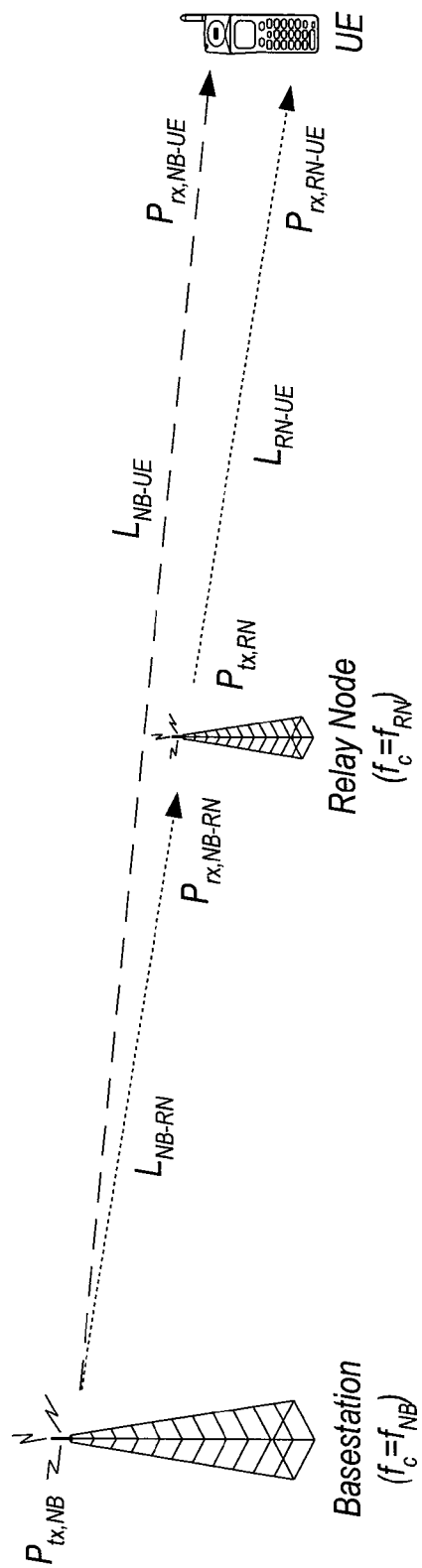
FIG. 4 shows a single-cell two-hop wireless communication system.
Figure 5A:
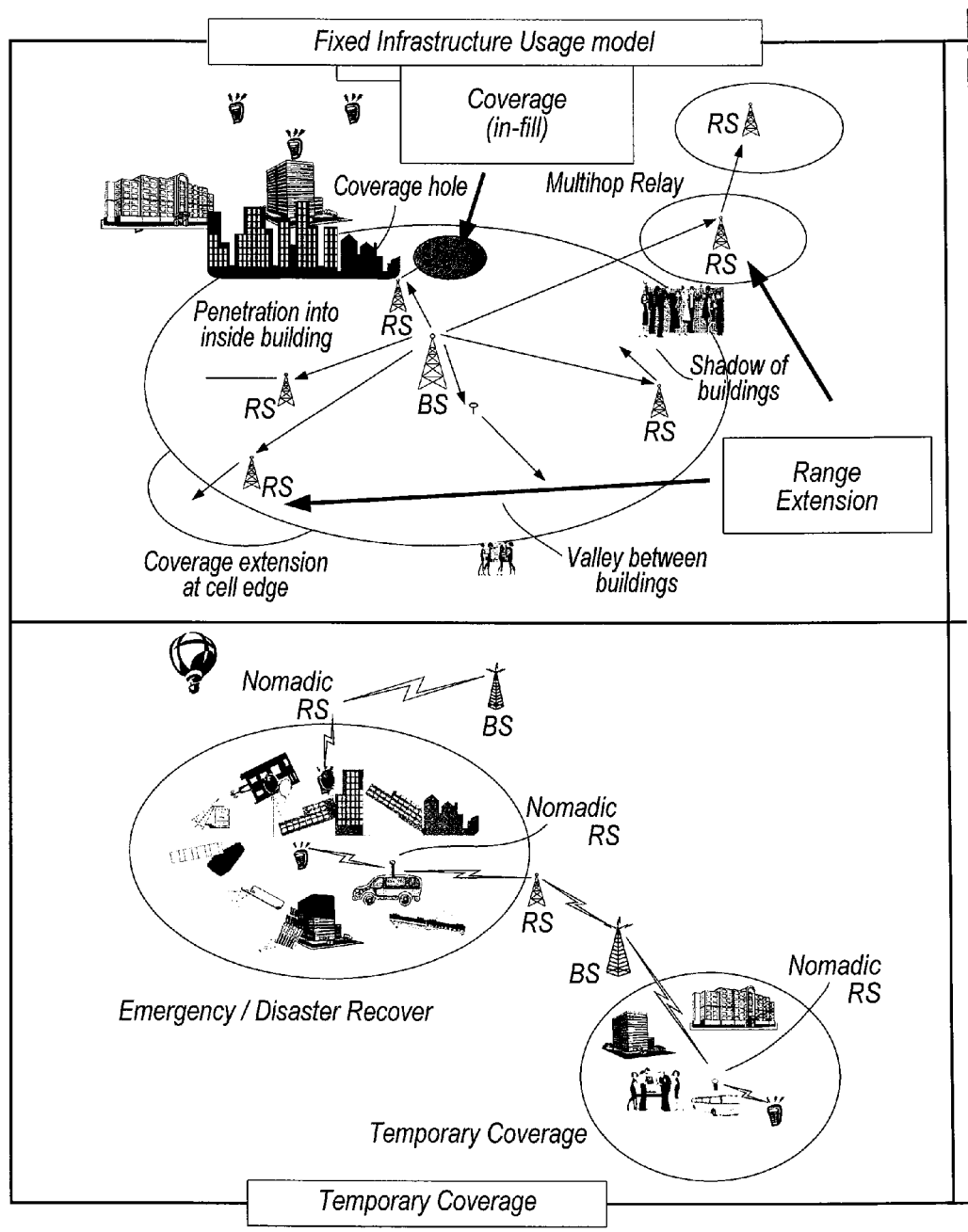
FIGS. 5a and 5b show applications of relay stations.
Figure 5B:
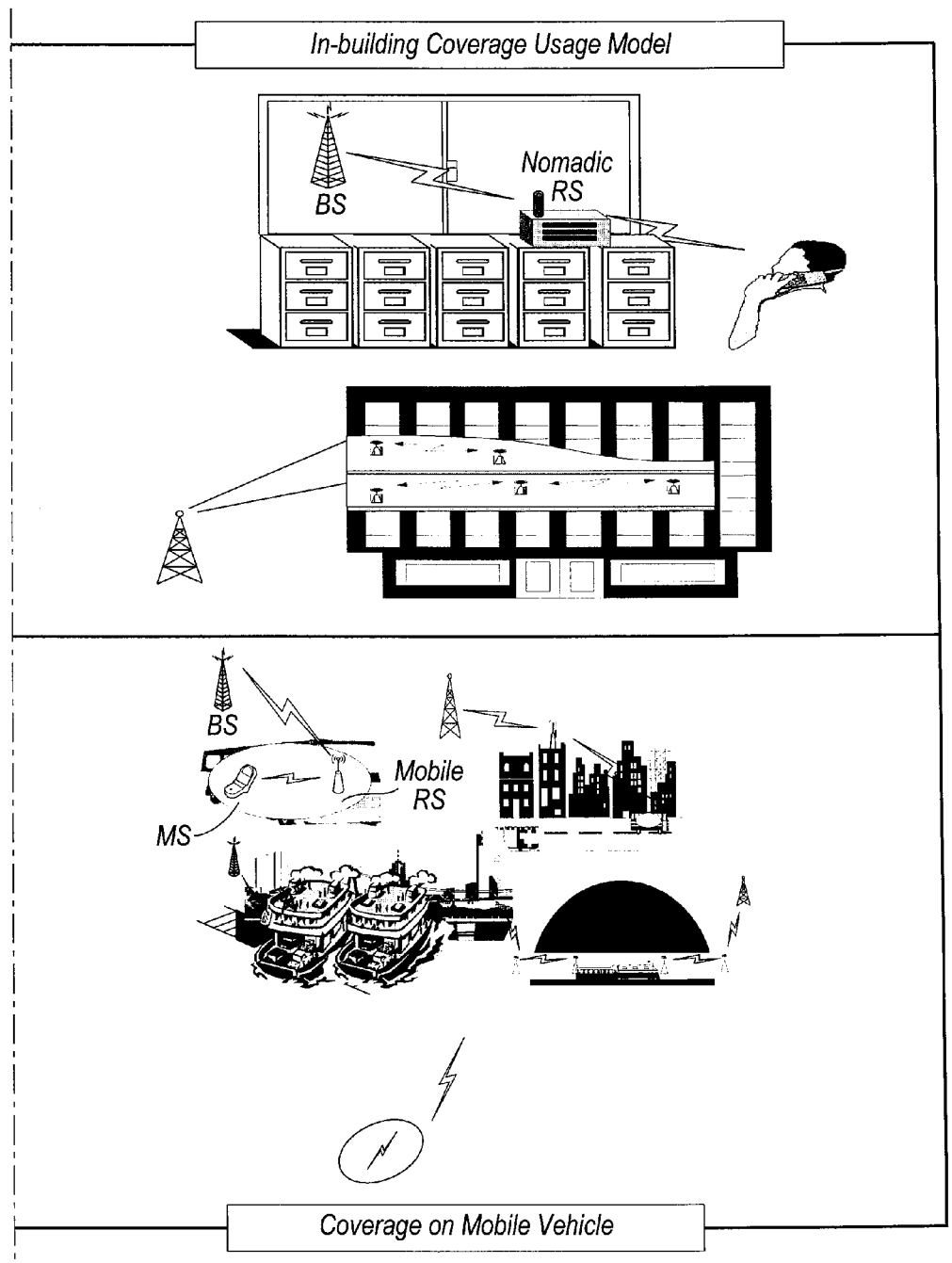
Figure 6:
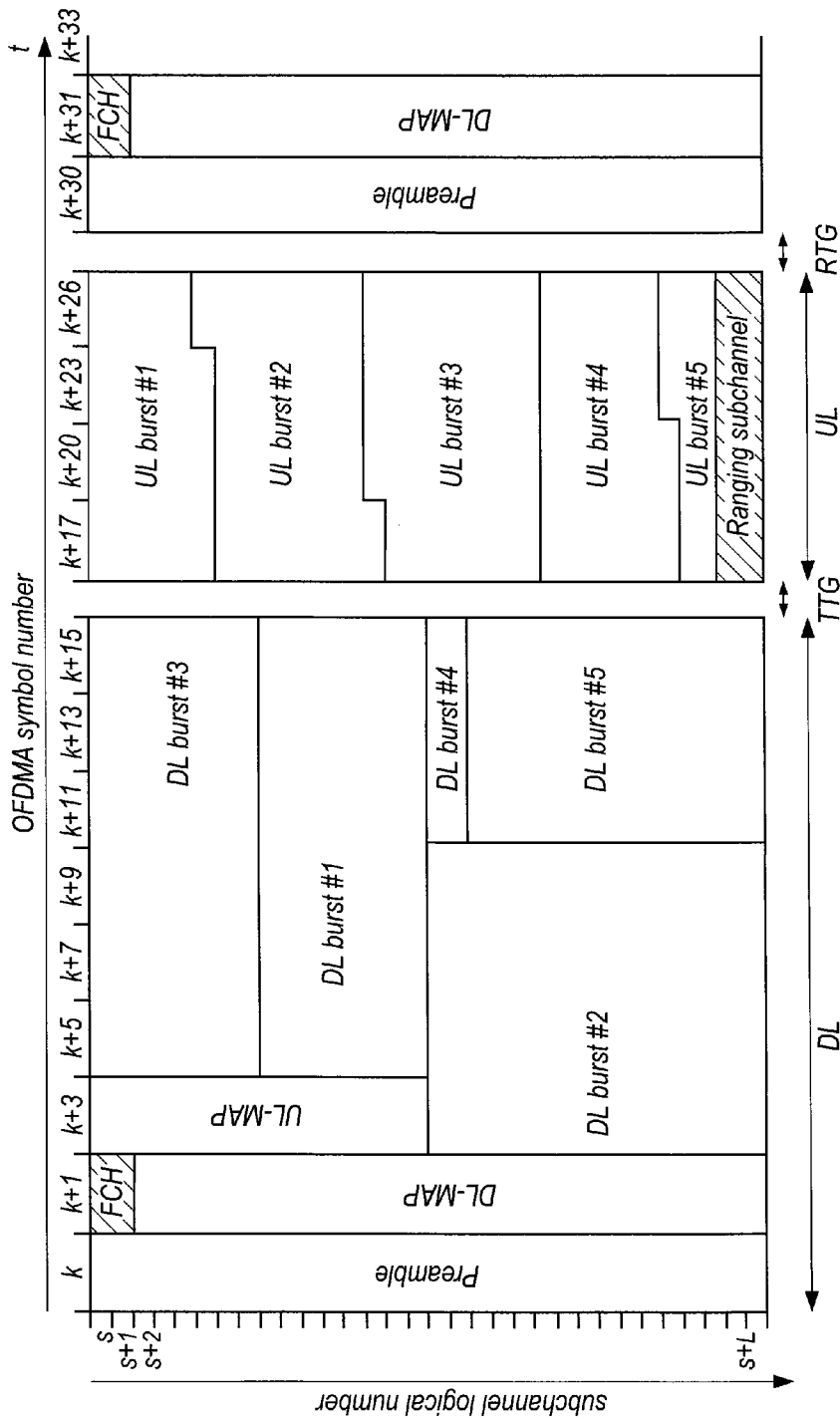
FIG. 6 shows a single hop TDD frame structure used in the OFDMA physical layer mode of the IEEE 802.16 standard.

FIG. 3 indicates one particular realization of the proposed frame structure in terms of how different user types may be allocated for transmission or reception within the various zone types.

In this case there are five link types identified (A-E), as illustrated in FIG. 3. A description of the zones that are used in this example is given in Table 2.

TABLE 2

Description of example of zone usage within one cell.

| Link | DL Zone Usage | UL Zone Usage | Comments |
|---|---|---|---|
| (A) | (1), (2), (5) | (6), (7) | MS and RS are spatially separated and therefore significant interference isolation exists. User does not support SDMA. |
| (B) | (1), (2), (3) | (6), (9) | MS and RS are spatially separated and therefore significant interference isolation exists. User does support SDMA. |
| (C) | (1), (2), (3), (5) | (6), (7), (9) | RS receives data in (3) and (7) and then transmits in (5) and (9) thereby enabling in-frame relaying. |
| (D) | (1), (2), (5) | (6), (7) | MS communicates with BS via RS. Transmission to the RS happens at the beginning of the UL subframe (7) to allow sufficient RS relay processing time. |
| (E) | (1), (2), (4) | (6), (8) | MSs that communicate directly with the BS that are not isolated from the RS use zones (4) & (8) to |

TABLE 2-continued

Description of example of zone usage within one cell.

| Link | DL Zone Usage | UL Zone Usage | Comments |
|---|---|---|---|
| | | | prevent RS interference from impairing link performance. |

One of the advantages of adopting the proposed frame structure of invention embodiments is that the BS can make use of all of the transmission resource all of the time to communicate with the RS and MS nodes in the network. This is enabled by reusing the transmission resource used on the RS to MS link for BS to MS communications. In order to effect this, and prevent such a reuse approach from causing excess interference, the BS must ensure that the users it communicates within this reuse zone (i.e. zones (5) & (9)) are sufficiently isolated from the users communicating with the RS. Thus, the BS essentially requires a mechanism to decide whether the users with which it communicates should be in the reuse zone (i.e. zones (5) & (9)) or the normal zone (i.e. zones (4) & (8)).

There are numerous algorithms that can be used to form such a mechanism. A few examples are listed below:
1. Ask the MS to perform a carrier-to-interference-plus-noise (CINR) measurement on the BS transmission during the reuse zone and during the normal zone. If the CINR is much higher in the normal zone then allocate the user to the normal zone. If the CINR is similar, then allocate the user to the reuse zone.
2. Start with all users in the normal zone. If the normal zone becomes fully loaded and cannot accommodate more users without the risk of imposing a reduction on the quality of service new and existing users will experience, then identify candidate users to move from the normal zone to the reuse zone. If subsequently the reported CINR for a user communicating with the BS in the reuse zone falls below a particular threshold then move that to the normal zone.

In summary, benefits of particular embodiments may include:
Enabling the construction and operation of simple, low cost relays that do not need to generate any control information or perform scheduling
Maximize spectral efficiency by ensuring that the BS does not have any time in the frame when it is idle
Minimize latency by enabling two-hop relaying to occur within one frame
Enable the system to potentially provide transparent operation to a legacy single-hop TDD users
The possibility to further improve spectral efficiency through using SDMA based techniques to enable the same transmission resource (frequency & time) to be used between the BS and the RSs and MSs within a cell.
Provide a mechanism to enable reuse of the RS-MS communication zone by the BS to communicate directly with MSs that will not cause a degradation in RS-MS link performance by performing such communications.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:
1. A transmission method for use in a two-hop time-division-duplex wireless communication system, the system comprising a source apparatus, destination apparatuses and an intermediate apparatus, said source apparatus being configured to transmit information along two links forming an indirect communication path extending from the source apparatus to at least one of the destination apparatuses via the intermediate apparatus, and the intermediate apparatus being configured to receive information from the source apparatus and to transmit the received information to the at least one destination apparatus, a time-frequency format for downlink and uplink subframes used for transmission in the system in discrete transmission periods, each discrete transmission period being a single downlink or a single uplink subframe with a plurality of transmission zones within each transmission period, each zone occupying a different part of that period, and being assignable to said source or intermediate apparatus for use in transmission, the method comprising:
  transmitting information along the path as two successive transmission signals, link by link, said signals being transmitted using different zones of a particular transmission period; wherein:
  a control information zone in the particular transmission period is used for broadcast of control information from said source apparatus to said intermediate apparatus and said destination apparatuses;
  a first zone in the particular transmission period is used for transmission from said source apparatus to said intermediate apparatus and a second, subsequent zone in the particular transmission period is used for transmission from said intermediate apparatus to the at least one destination apparatus;
  said first and second transmission zones of the transmission period are either side in time of a third transmission zone of the transmission period, which is used for transmission along a single link forming a direct communication path from said source apparatus to another destination apparatus, and in which there is no transmission or reception by the intermediate apparatus, but processing is performed in said intermediate apparatus, so as to configure the information for transmission in the second transmission zone based upon the information received in the first transmission zone;
  said second zone is also used for direct transmission along a single link forming a direct communication path from said source apparatus to a further destination apparatus on the downlink; and
  said control information enables said intermediate apparatus and said destination apparatuses to receive transmissions in said first zone and said second zone, the method further comprising:
  employing said first transmission zone to transmit information from the source apparatus to a still further destination apparatus along a single link forming a direct communication path, so that information is transmitted from the source apparatus to both said intermediate apparatus and said still further destination apparatus during the part of the particular transmission period corresponding to the first transmission zone;

determining whether the destination apparatuses can receive the control information from the source apparatus and adding an extra control information zone in the particular transmission period for broadcast of control information from said intermediate apparatus to said destination apparatus based on the determination.

2. The transmission method according to claim 1, wherein said control zone occupies a part of the transmission period preceding the part of the transmission period occupied by the first transmission zone.

3. The transmission method according claim 1, comprising:

employing said second transmission zone to transmit information from the source apparatus to the said further destination apparatus along the direct communication path, so that information is transmitted from said intermediate apparatus to said destination apparatus and from the source apparatus to said further destination apparatus during the part of the transmission period corresponding to the second transmission zone.

4. The transmission method according to claim 1, comprising:

employing said third transmission zone to transmit information from another source apparatus to said at least one of the destination apparatuses along a direct communication path, so that information is transmitted from that another source apparatus during said processing in the intermediate apparatus.

5. The transmission method according to claim 1, comprising:

employing said first transmission zone to transmit information from another source apparatus to said at least one of the destination apparatuses along a direct communication path, so that information is transmitted from the source apparatus to said intermediate apparatus and from that another source apparatus to said at least one of the destination apparatuses during the part of the transmission period corresponding to the first transmission zone.

6. The transmission method according to claim 1, comprising:

employing said second transmission zone to transmit information from another source apparatus to said at least one of the destination apparatuses along the direct communication path, so that information is transmitted from said intermediate apparatus to said at least one of the destination apparatuses and from that another source apparatus to said at least one of the destination apparatuses during the part of the transmission period corresponding to the second transmission zone.

7. The transmission method according to claim 1, comprising employing a space division multiple access technique in one or more of said transmission zones of the transmission period.

8. The transmission method according to claim 1, wherein said system is an OFDM or OFDMA system, and wherein the time-frequency format is a format for an OFDM or OFDMA downlink or uplink sub-frame of an OFDM or OFDMA time-division-duplex frame.

9. The transmission method according to claim 1, wherein each said discrete transmission period is a sub-frame period.

10. The transmission method according to claim 1, wherein each said transmission zone comprises a zone in an OFDM or OFDMA frame structure.

11. The transmission method according to claim 1, wherein the or each source apparatus is a base station.

12. The transmission method according to claim 1, wherein the or each source apparatus is a user terminal.

13. The transmission method according to claim 1, wherein the or each destination apparatus is a base station.

14. The transmission method according to claim 1, wherein the or each destination apparatus is a user terminal.

15. The transmission method according to claim 1, wherein the or each intermediate apparatus is a relay station.

16. A two-hop wireless time-division-duplex communication system, the system comprising:

a source apparatus, destination apparatuses and an intermediate apparatus, said source apparatus being configured to transmit information along two links forming an indirect communication path extending from the source apparatus to at least one of the destination apparatuses via the intermediate apparatus, and the intermediate apparatus being configured to receive information from the source apparatus and to transmit the received information to the at least one destination apparatus;

the system using a time-frequency format for downlink and uplink subframes for transmission in the system in discrete transmission periods, each discrete transmission period being a single downlink or a single uplink subframe with a plurality of transmission zones within each transmission period, each zone occupying a different part of that period and being assignable to said source or intermediate apparatus for use in transmission; and further comprising a transmitter configured to employ said format to transmit information along the relayed path as two successive transmission signals, link by link, using transmission zones of a particular transmission period, wherein a control information zone in the particular transmission period is used for broadcast of control information from said source apparatus to said intermediate apparatus and said destination apparatuses;

a first zone in the particular transmission period is used for transmission from said source apparatus to said intermediate apparatus and a second, subsequent zone in the particular transmission period is used for transmission from said intermediate apparatus to the at least one destination apparatus;

said first and second transmission zones of the transmission period are either side in time of a third transmission zone of the transmission period, which is used for transmission along a single link forming a direct communication path from said source apparatus to a further destination apparatus, and in which there is no transmission or reception by the intermediate apparatus, but processing is performed in said intermediate apparatus, so as to configure the information for transmission in the second transmission zone based upon the information received in the first transmission zone;

said second zone is also used for direct transmission along a single link forming a direct communication path from said source apparatus to a further destination apparatus on the downlink; and said control information enables said intermediate apparatus and said destination apparatuses to receive transmissions in said first zone and said second zone; and wherein said first transmission zone is used to transmit information from the source apparatus to a still further destination apparatus along a single link forming a direct communication path, so that information is transmitted from the source apparatus to both said intermediate apparatus and said still further destination apparatus during the part of the particular transmission period corresponding to the first transmission zone;

wherein the system further comprises a processor that determines whether the destination apparatuses can receive the control information from the source apparatus and adding an extra control information zone in the particular transmission period for broadcast of control information from said intermediate apparatus to said destination apparatus based on the determination.

17. Non-transitory computer-readable media storing computer programs which, when executed on computing devices of a two-hop wireless time-division-duplex communication system, causes the system to carry out a transmission method, the system comprising a source apparatus, destination apparatuses and an intermediate apparatus, said source apparatus being configured to transmit information along two links forming an indirect communication path extending from the source apparatus to at least one of the destination apparatuses via the intermediate apparatus, and the intermediate apparatus being configured to receive information from the source apparatus and to transmit the received information to the at least one destination apparatus, a time-frequency format for downlink and uplink subframes used for transmission in the system in discrete transmission periods, each discrete transmission period being a single downlink or a single uplink subframe with a plurality of transmission zones within each transmission period, each zone occupying a different part of that period, and being assignable to said source or intermediate apparatus for use in transmission, the method comprising:

transmitting information along the relayed path as two successive transmission signals, link by link, said signals being transmitted using different zones of a particular transmission period; wherein:

a control information zone in the particular transmission period is used for broadcast of control information from said source apparatus to said intermediate apparatus and said destination apparatuses;

a first zone in the particular transmission period is used for transmission from said source apparatus to said intermediate apparatus and a second, subsequent zone in the particular transmission period is used for transmission from said intermediate apparatus to the at least one destination apparatus;

said first and second transmission zones of the transmission period are either side in time of a third transmission zone of the transmission period, which is used for transmission along a single link forming a direct communication path from said source apparatus to another destination apparatus, and in which there is no transmission or reception by the intermediate apparatus, but processing is performed in said intermediate apparatus, so as to configure the information for transmission in the second transmission zone based upon the information received in the first transmission zone;

said second zone is also used for direct transmission along a single link forming a direct communication path from said source apparatus to a further destination apparatus on the downlink, and said control information enables said intermediate apparatus and said destination apparatuses to receive transmissions in said first zone and said second zone, the method further comprising:

employing said first transmission zone to transmit information from the source apparatus to a still further destination apparatus along a single link forming a direct communication path, so that information is transmitted from the source apparatus to both said intermediate apparatus and said still further destination apparatus during the part of the particular transmission period corresponding to the first transmission zone;

determining whether the destination apparatuses can receive the control information from the source apparatus and adding an extra control information zone in the particular transmission period for broadcast of control information from said intermediate apparatus to said destination apparatus based on the determination.

18. An intermediate apparatus for use in a two-hop wireless time-division-duplex communication system, the system further comprising a source apparatus, and destination apparatuses, said source apparatus being configured to transmit information along a series of links forming an indirect communication path extending from the source apparatus to at least one of the destination apparatuses via the intermediate apparatus, and the intermediate apparatus being configured to receive information from a previous apparatus along the path and to transmit the received information to a subsequent apparatus along the path, the system using a time-frequency format for downlink and uplink subframes for transmission in the system in discrete transmission periods, each discrete transmission period being a single downlink or a single uplink subframe with a plurality of transmission zones within each transmission period, each zone occupying a different part of that period and being assignable to said source or intermediate apparatus for use in transmission; and the intermediate apparatus comprising:

a transmitter configured to employ said format for one transmission period to receive information in a first zone window of said period and to transmit said information in a second, subsequent transmission zone during the same transmission period such that said information passes along the two links in a single transmission period; wherein a control information zone in the particular transmission period is used for broadcast of control information from said source apparatus to said intermediate apparatus and said destination apparatuses;

said first zone in the particular transmission period is used for transmission from said source apparatus to said intermediate apparatus and said second, subsequent zone in the particular transmission period is used for transmission from said intermediate apparatus to the at least one destination apparatus;

said first and second transmission zones of the transmission period are either side in time of a third transmission zone of the transmission period, which is used for transmission along a single link forming a direct communication path from said source apparatus to another destination apparatus, and in which there is no transmission or reception by the intermediate apparatus, but processing is performed in said intermediate apparatus, so as to configure the information for transmission in the second transmission zone based upon the information received in the first transmission zone;

said second zone is also used for direct transmission along a single link forming a direct communication path from said source apparatus to a further destination apparatus on the downlink;
said control information enables said intermediate apparatus and said destination apparatuses to receive transmissions in said first zone and said second zone; and
said first transmission zone is used to transmit information from the source apparatus to a still further destination apparatus along a single link forming a direct communication path, so that information is transmitted from the source apparatus to both said intermediate apparatus and said still further destination apparatus during the part of the particular transmission period corresponding to the first transmission zone;
wherein the system further comprises a processor that determines whether the destination apparatuses can receive the control information from the source apparatus and adding an extra control information zone in the particular transmission period for broadcast of control information from said intermediate apparatus to said destination apparatus based on the determination.

19. A transmission method for use in an intermediate apparatus of a two-hop wireless time-division-duplex communication system, the system further comprising a source apparatus and destination apparatuses, said source apparatus being configured to transmit information along two links forming an indirect communication path extending from the source apparatus to at least one of the destination apparatuses via the intermediate apparatus, and the intermediate apparatus being configured to receive information from the source apparatus and to transmit the received information to the at least one destination apparatus, the intermediate apparatus having access to a time-frequency format for downlink and uplink subframes used for transmission in the system in discrete transmission periods, each discrete transmission period being a single downlink or a single uplink subframe with a plurality of transmission zones within each transmission period, each zone occupying a different part of that period, and being assignable to said source or intermediate apparatus for use in transmission, the method comprising:
employing said format for one such transmission period to receive information in a first zone of said interval and to transmit said information in a second zone during the same transmission period such that said information passes along the two links in a single transmission period; wherein
a control information zone in the particular transmission period is used for broadcast of control information from said source apparatus to said intermediate apparatus and said destination apparatuses;
the first zone in the particular transmission period is used for transmission from said source apparatus to said intermediate apparatus and the second, subsequent zone in the particular transmission period is used for transmission from said intermediate apparatus to said destination apparatus;
said first and second transmission zones of the transmission period are either side in time of a third transmission zone of the transmission period, which is used for transmission along a single link forming a direct communication path from said source apparatus to another destination apparatus, and in which there is no transmission or reception by the intermediate apparatus, but processing is performed in said intermediate apparatus, so as to configure the information for transmission in the second transmission zone based upon the information received in the first transmission zone;
said second zone is also used for direct transmission along a single link forming a direct communication path from said source apparatus to a further destination apparatus on the downlink, and
said control information enables said intermediate apparatus and said destination apparatuses to receive transmissions in said first zone and said second zone, the method further comprising:
employing said first transmission zone to transmit information from the source apparatus to a still further destination apparatus along a single link forming a direct communication path, so that information is transmitted from the source apparatus to both said intermediate apparatus and said still further destination apparatus during the part of the particular transmission period corresponding to the first transmission zone;
determining whether the destination apparatuses can receive the control information from the source apparatus and adding an extra control information zone in the particular transmission period for broadcast of control information from said intermediate apparatus to said destination apparatus based on the determination.

20. A non-transitory computer-readable media storing a computer program, which when executed on a computing device of an intermediate apparatus in a two-hop wireless time-division-duplex communication system, causes the intermediate apparatus to carry out a transmission method, the system further comprising a source apparatus and destination apparatuses, said source apparatus being configured to transmit information along two links forming an indirect communication path extending from the source apparatus to at least one of the destination apparatuses via the intermediate apparatus, and the intermediate apparatus being configured to receive information from the source apparatus and to transmit the received information to the at least one destination apparatus, the intermediate apparatus having access to a time-frequency format for downlink and uplink subframes used for transmission in the system in discrete transmission periods, each discrete transmission period being a single downlink or a single uplink subframe with a plurality of transmission zones within each transmission period, each zone occupying a different part of that period, and being assignable to said source or intermediate apparatus for use in transmission, the method comprising:
employing said format for one such transmission period to receive information in a first zone of said interval and to transmit said information in a second zone during the same transmission period such that said information passes along the two links in a single transmission period; wherein
a control information zone in the particular transmission period is used for broadcast of control information from said source apparatus to said intermediate apparatus and said destination apparatuses;
the first zone in the particular transmission period is used for transmission from said source apparatus to said intermediate apparatus and the second, subsequent zone in the particular transmission period is used for transmission from said intermediate apparatus to said destination apparatus;
said first and second transmission zones of the transmission period are either side in time of a third transmission zone of the transmission period, which is used for transmission along a single link forming a direct communication path from said source apparatus to another destination apparatus, and in which there is no transmission or reception by the intermediate apparatus, but processing is performed in said intermediate apparatus, so as to configure the information for transmission in the second transmission zone based upon the information received in the first transmission zone;

said second zone is also used for direct transmission along a single link forming a direct communication path from said source apparatus to a further destination apparatus on the downlink; and said control information enables said intermediate apparatus and said destination apparatuses to receive transmissions in said first zone and said second zone, the method further comprising:

employing said first transmission zone to transmit information from the source apparatus to a still further destination apparatus along a single link forming a direct communication path, so that information is transmitted from the source apparatus to both said intermediate apparatus and said still further destination apparatus during the part of the particular transmission period corresponding to the first transmission zone;

determining whether the destination apparatuses can receive the control information from the source apparatus and adding an extra control information zone in the particular transmission period for broadcast of control information from said intermediate apparatus to said destination apparatus based on the determination.

21. A source apparatus in a two-hop wireless time-division-duplex communication system, the system comprising the source apparatus, destination apparatuses and an intermediate apparatus, said source apparatus being configured to transmit information along two links forming an indirect communication path extending from the source apparatus to at least one of the destination apparatus via the intermediate apparatus, and the intermediate apparatus being configured to receive information from the source apparatus and to transmit the received information to the at least one destination apparatus, a time-frequency format for the downlink and uplink subframes used for transmission in the system in discrete transmission periods, each discrete transmission period being a single downlink or a single uplink subframe with a plurality of transmission zones within each transmission period, each zone occupying a different part of that period, and being assignable to said source or intermediate apparatus for use in transmission, the source apparatus comprising:

a transmitter configured to transmit information along the path as a first of two successive transmission signals, in a first link, the first and another transmission signal being transmitted using different zones of a particular transmission period; wherein:

a control information zone in the particular transmission period is used for broadcast of control information from said source apparatus to said intermediate apparatus and said destination apparatuses;

a first zone in the particular transmission period is used for transmission from said source apparatus to said intermediate apparatus and a second, subsequent zone in the particular transmission period is used for transmission from said intermediate apparatus to the at least one destination apparatus;

said first and second transmission zones of the transmission period are either side in time of a third transmission zone of the transmission period, which is used for transmission along a single link forming a direct communication path from said source apparatus to another destination apparatus, and in which there is no transmission or reception by the intermediate apparatus, but processing is performed in said intermediate apparatus, so as to configure the information for transmission in the second transmission zone based upon the information received in the first transmission zone;

said second zone is also used for direct transmission along a single link forming a direct communication path from said source apparatus to a further destination apparatus on the downlink;

said control information enables said intermediate apparatus and said destination apparatuses to receive transmissions in said first zone and said second zone; and said first transmission zone is used to transmit information from the source apparatus to a still further destination apparatus along a single link forming a direct communication path, so that information is transmitted from the source apparatus to both said intermediate apparatus and said still further destination apparatus during the part of the particular transmission period corresponding to the first transmission zone;

wherein the system further comprises a processor that determines whether the destination apparatuses can receive the control information from the source apparatus and adding an extra control information zone in the particular transmission period for broadcast of control information from said intermediate apparatus to said destination apparatus based on the determination.

22. A transmission method for use in a source apparatus of a two-hop time-division-duplex wireless communication system, the system comprising: the source apparatus, destination apparatuses and an intermediate apparatus, said source apparatus being configured to transmit information along two links forming an indirect communication path extending from the source apparatus to at least one of the destination apparatuses via the intermediate apparatus, and the intermediate apparatus being configured to receive information from the source apparatus and to transmit the received information to the at least one destination apparatus;

a time-frequency format for downlink and uplink subframes used for transmission in the system in discrete transmission periods, each discrete transmission period being a single downlink or a single uplink subframe with a plurality of transmission zones within each transmission period, each zone occupying a different part of that period, and being assignable to said source or intermediate apparatus for use in transmission, the method comprising:

employing said format to transmit information along the path as a first of two successive transmission signals, in a first link, the first and another transmission signal being transmitted using different zones of a particular transmission period; wherein:

a control information zone in the particular transmission period is used for broadcast of control information from said source apparatus to said intermediate apparatus and said destination apparatuses;

a first zone in the particular transmission period is used for transmission from said source apparatus to said intermediate apparatus and a second, subsequent zone in the particular transmission period is used for transmission from said intermediate apparatus to the at least one destination apparatus;

said first and second transmission zones of the transmission period are either side in time of a third transmission zone of the transmission period, which is used for transmission along a single link forming a direct communication path from said source apparatus to another destination apparatus, and in which there is no transmission or reception by the intermediate apparatus, but processing is performed in said intermediate apparatus, so as to configure the information for transmission in the second transmission zone based upon the information received in the first transmission zone;

said second zone is also used for direct transmission along a single link forming a direct communication path from said source apparatus to a further destination apparatus on the downlink; and said control information enables said intermediate apparatus and said destination apparatuses to receive transmissions in said first zone and said second zone; the method further comprising:

employing said first transmission zone to transmit information from the source apparatus to a still further destination apparatus along a single link forming a direct communication path, so that information is transmitted from the source apparatus to both said intermediate apparatus and said still further destination apparatus during the part of the particular transmission period corresponding to the first transmission zone;

determining whether the destination apparatuses can receive the control information from the source apparatus and adding an extra control information zone in the particular transmission period for broadcast of control information from said intermediate apparatus to said destination apparatus based on the determination.

23. A non-transitory computer-readable media storing a computer program which when executed on a computing device of a source apparatus of a two hop time-division-duplex wireless communication system causes the source apparatus to carry out a transmission method, the system comprising:

the source apparatus, destination apparatuses and an intermediate apparatus, said source apparatus being configured to transmit information along two links forming an indirect communication path extending from the source apparatus to at least one of the destination apparatuses via the intermediate apparatus, and the intermediate apparatus being configured to receive information from the source apparatus and to transmit the received information to the at least one destination apparatus;

a time-frequency format for downlink and uplink subframes used for transmission in the system in discrete transmission periods, each discrete transmission period being a single downlink or a single uplink subframe with a plurality of transmission zones within each transmission period, each zone occupying a different part of that period, and being assignable to said source or intermediate apparatus for use in transmission, the method comprising:

employing said format to transmit information along the path as a first of two successive transmission signals, in a first link, the first and another transmission signal being transmitted using different zones of a particular transmission period; wherein:

a control information zone in the particular transmission period is used for broadcast of control information from said source apparatus to said intermediate apparatus and said destination apparatuses;

a first zone in the particular transmission period is used for transmission from said source apparatus to said intermediate apparatus and a second, subsequent zone in the particular transmission period is used for transmission from said intermediate apparatus to the at least one destination apparatus;

said first and second transmission zones of the transmission period are either side in time of a third transmission zone of the transmission period, which is used for transmission along a single link forming a direct communication path from said source apparatus to another destination apparatus, and in which there is no transmission or reception by the intermediate apparatus, but processing is performed in said intermediate apparatus, so as to configure the information for transmission in the second transmission zone based upon the information received in the first transmission zone;

said second zone is also used for direct transmission along a single link forming a direct communication path from said source apparatus to a further destination apparatus on the downlink; and said control information enables said intermediate apparatus and said destination apparatuses to receive transmissions in said first zone and said second zone; the method further comprising:

employing said first transmission zone to transmit information from the source apparatus to a still further destination apparatus along a single link forming a direct communication path, so that information is transmitted from the source apparatus to both said intermediate apparatus and said still further destination apparatus during the part of the particular transmission period corresponding to the first transmission zone;

determining whether the destination apparatuses can receive the control information from the source apparatus and adding an extra control information zone in the particular transmission period for broadcast of control information from said intermediate apparatus to said destination apparatus based on the determination.

* * * * *